Figure 3:
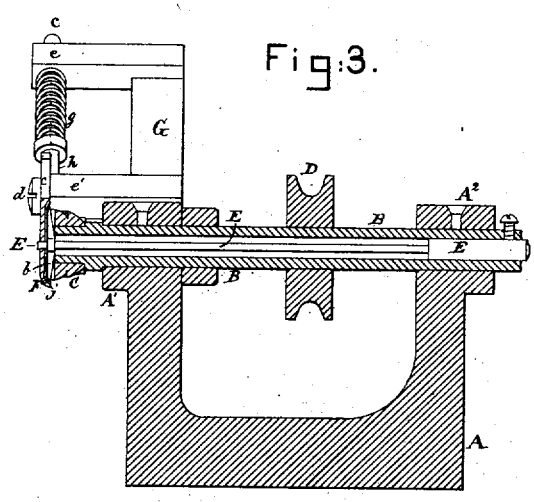

J. H. BUSELL.

Assignor, by mesne Assignments, to the BUSELL EDGE TRIMMER Co.

Heel and Sole Trimming Machine.

No. 8,239. Reissued May 21, 1878.

Witnesses.

N. E. Whitney.

L. F. Conna.

Inventor.

James H Busell by Crosby & Gregory Attys

N. PETERS, PHOTO-LITHOGRAPHER, WASHINGTON, D. C.

UNITED STATES PATENT OFFICE.

JAMES H. BUSELL, OF BOSTON, MASSACHUSETTS, ASSIGNOR, BY MESNE ASSIGNMENTS, TO THE BUSELL EDGE TRIMMER COMPANY.

IMPROVEMENT IN HEEL AND SOLE TRIMMING MACHINES.

Specification forming part of Letters Patent No. 167,874, dated September 21, 1875; Reissue No. 8,239, dated May 21, 1878; application filed May 1, 1878.

*To all whom it may concern:*

Be it known that I, JAMES H. BUSELL, of Boston, in the county of Suffolk and State of Massachusetts, have invented certain new and useful Improvements in Heel and Sole Trimming Machines, of which the following, taken in connection with the accompanying drawings, is a specification.

My invention relates to that class of heel and sole trimming machines in which a rotary cutter is used for reducing the edge of the heel or sole, and especially to the arrangement of the cutters and gage or guide; and it consists, first, in the use, in combination with a rotary cutter for reducing the edge of the heel or sole, of a rand-knife arranged to revolve in union with the edge-trimming cutter, and to be moved transversely of said cutter, or in a direction at right angles to the axis of revolution, so that the path of revolution may be either concentric or eccentric to the path of revolution of the edge-trimming cutter, for the purpose of adapting the length of that portion of the rand-cutter which projects beyond the periphery of the edge-trimming cutter upon the side next to the boot or shoe to the depth of the rand or the projection of the sole beyond the upper.

My invention further consists in forming in the outer radial face or edge-trimming cutter a recess or groove, in combination with a rand-knife placed within said recess or groove, and arranged to revolve in unison with said edge-trimming cutter, but in a variable path of revolution, which may be concentric or eccentric to the path of revolution of the edge-trimming cutter.

My invention further consists in mounting the edge-trimming cutter upon a hollow shaft, in combination with a small central spindle located in the hollow of said shaft, and connected therewith by means of a pin, set-screw, or other suitable device at its rear end, said spindle being made, for the greater part of its length, of considerable less diameter than the hollow in said shaft, so that its front end, upon which is secured the rand-knife, may be easily moved into a position eccentric to said hollow shaft, said spindle (which should be made of steel) springing for the purpose.

My invention further consists in a yielding rand-guide, having a recess formed in its inner face to receive the rand-knife, so connected with said yielding guide that said rand-knife will always revolve in a path concentric with said recess in whatever position the rand-guide may be.

My invention further consists in the organization, in a trimming-machine, of a guide to enter between the upper and sole, a revolving rand-knife located at the rear side of the guide, and an edge-trimming cutter provided at its end with a notch to receive the rand-knife, whereby a portion of the cutting-edge of the edge-cutter may be extended beyond the cutting-edge of the rand-knife.

Also, in a trimming-machine, an edge-cutter provided at one end with a recess, and a rand-cutter placed in such recess, whereby some of the cutting-edges of the edge-cutter are, in the rotation of the cutter, made to cut across the entire edge of the sole, and the cutting-edges of the rand-knife are so placed as to operate upon and remove one corner of the sole previously trimmed by the longer cutting-edges of the edge-cutter.

Also, in the combination, with an edge-trimming cutter having cutting-edges of different lengths in the line of the axis of rotation of the cutter, of a rand-knife placed opposite the ends of the shorter cutting-edges, a portion of the cutting-edge of the rand-knife being thereby located back of the forward end of the longer cutting-edges of the edge-cutter, to operate substantially as described.

Figure 1:
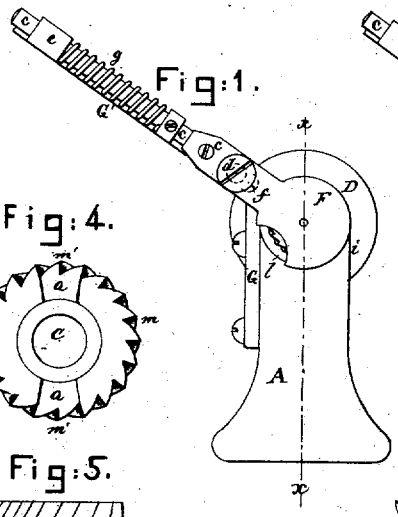
Figure 2:
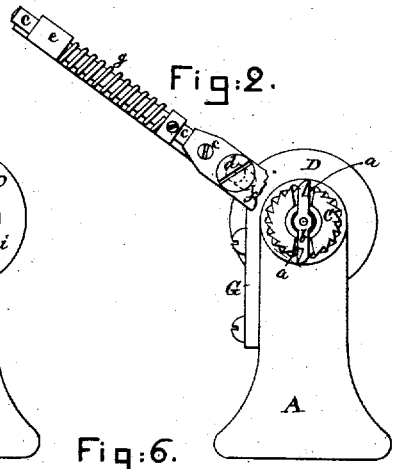
Figure 4:
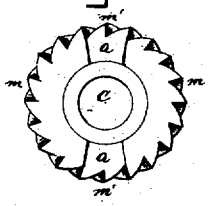
Figure 5:
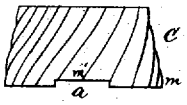
Figure 6:
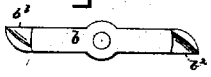

Figure 1 of the drawings is a front-end elevation of a machine illustrating my invention. Fig. 2 is a similar view, with the rand-guide broken away to show more clearly the cutting-tools. Fig. 3 is a vertical longitudinal section on line *x x* on Fig. 1. Figs. 4 and 5 are, respectively, an end elevation and plan of the edge-trimming cutter, drawn to an enlarged scale; and Fig. 6 shows the rand-knife removed.

A is the frame of the machine, provided with the bearings $A^1$ and $A^2$, in which is mounted the hollow shaft or sleeve B, upon one end of which is firmly secured the edge-trimming cutter C, and upon its middle the driving-pulley D. The cutter C has formed upon its periphery a series of spiral cutting-edges, $m$ $m'$, as shown, and at its outer end or face a recess or groove, $a$, as seen in Figs. 4 and 5.

The rand-knife $b$, provided with cutting-edges $b^2$ $b^3$, (see Fig. 6,) is placed within this notch opposite the ends of the short cutting-edges $m'$, and in front of and behind such rand-knife the cutting-edges $m$ are made to project laterally or horizontally beyond the cutting-edges $b^2$ $b^3$ of the rand-knife, so that such longer cutting-edges in the rotation of the cutter cut the sole for its whole thickness, shaping the edge square, and then the rand-knife operates against the sole-edge trimmed by the cutters $m$, and cuts the square corner from the edge of the sole nearest the upper. If the edge-trimming cutter were not provided with the cutting-edges terminating at different distances from its face, or were not notched for the reception of the rand-knife, the upper corner of the sole next the upper would show a "fin."

E is a steel spindle, made to fit the hollow in the sleeve B for a short distance at its rear end, its remaining portion being reduced in diameter, as shown in Fig. 3, so that its front end may be easily moved into a position eccentric to the axis of the sleeve-shaft B by springing or bending said spindle.

To the front end of the spindle E is firmly secured the rand-knife $b$, consisting of a steel bar of a width somewhat less than the recess $a$ in the end face of the cutter C, and a thickness about equal to the depth of said recess, and of sufficient length to project beyond the periphery of the cutter C upon two opposite sides a distance about equal to the greatest projection of the sole beyond the upper, the projecting portion upon each end being formed of suitable shape and ground to present keen cutting-edges $b^2$ $b^3$.

F is a rand guide or shield, made nearly circular in form, with an arm, $c$, projecting therefrom, and fitted to slide endwise upon the pin $d$, and, through the bearing $e$ of the stand G, secured to the frame A in any suitable manner.

The pin $d$ passes through the slot $f$ formed in the arm $c$, and is screwed into the arm $e'$ of the stand G, the end of the slot $f$ serving to limit the endwise motion in one direction of the shield or guide F.

The arm $c$ is surrounded by the spiral spring $g$, which serves to hold the rand guide or shield F in a position concentric with the axis of the edge-trimming cutter C, in which position the shoulder $h$ of the arm $c$ bears against the arm $e'$ of the stand G.

The inner face of the shield F has formed therein a circular recess, within which the rand-knife $b$ rests.

The spindle E projects through the rand-knife $b$, and has a bearing in the rand guide or shield F concentric with the circular recess formed in its rear face.

The rounded end $i$ of the rand guide or shield F must be made thin, and the lip $j$, surrounding the recess formed in its rear face, projects over the end of the rand-knife just sufficient to prevent the upper from being injured by said cutter.

The boot or shoe to be trimmed is placed against the guide or shield F at $i$, and moved in a direction at right angles to the arm $c$, the guide F fitting into the rand of the shoe, and being made to yield by the pressure applied thereto till the cutter C has acted upon the edge of the sole or heel to reduce it to the proper even and true surface, while at the same time the rand-knife $b$ trims the upper or rand surface of the sole in an obvious manner, the width of the cut made by said rand-knife varying according to the position of the rand guide or shield F.

The projection of the cutting portion of the cutter C upon either side of the recess $a$ serves to insure a clean cut and finish of the upper edge of the heel or sole.

A portion of the lip $j$ surrounding the recess formed in the rear face of the guide F is cut away at $l$, to permit the escape of the chips taken off by the knife $b$.

What I claim as new, and desire to secure by Letters Patent of the United States, is—

1. In a heel or sole trimming machine, the combination of a rotary edge-trimming cutter and a rand-knife, arranged to rotate in unison therewith around an independent axis, the position of which relative to the axis of the edge-trimming cutter may be varied by the pressure of the boot or shoe, according as the width of the projecting portion of the heel or sole is greater or less, substantially as described.

2. The combination of the hollow or sleeve shaft B, an edge-trimming cutter, the spindle E, and rand-knife $b$, to operate substantially as and for the purpose specified.

3. The cutter provided with the recess or groove $a$, in combination with the rand-knife $b$, adapted to rotate about a movable or variable axis, as and for the purposes described.

4. In a heel or sole trimming machine, the combination of a rotary edge-trimming cutter, a rand-knife adapted to rotate about a movable axis, and a yielding rand guide or shield inclosing the rand-knife and forming a bearing for its spindle, substantially as described, for the purposes specified.

5. In an organized trimming-machine, the following instrumentalities, viz: a guide to enter between the sole and upper, a revolving rand-knife located at the rear side of the guide, and an edge-trimming cutter, provided at its end with a notch or recess to receive the rand-knife, whereby a portion of the cutting-edge of the edge-cutter may be extended beyond the cutting-edges of the rand-knife, substantially as described.

6. In a trimming-machine, an edge-trimming cutter provided at one end with a recess, and a rand-knife located in said recess, whereby some of the cutting-edges of the edge-cutter are, in the rotation of the cutter, made to cut across the entire edge of the sole, and the cutting-edges of the rand-knife are placed to operate upon and remove one corner of the sole previously trimmed by the edge-trimming cutter, substantially as described.

7. The combination, with an edge-trimming cutter having cutting-edges terminating at different distances with relation to its front end or face, or of different lengths in the line of the axis of rotation of the cutter, of a rand-knife placed opposite the ends of the shorter cutting-edges, or those not extended to the face of the cutter, a portion of the cutting-edge of the rand-knife being thereby located back of the forward ends of the longer cutting-edges of the edge-cutter, to operate substantially as described.

8. The edge-trimming cutter notched at *a*, and the rand-knife located in such notch, combined with a guide to enter between the sole and upper, the guide being provided with an open space to permit the discharge of chips removed from the sole by the rand-knife, substantially as described.

JAMES H. BUSELL.

Witnesses:
G. W. GREGORY,
A. E. WHITNEY.